United States Patent [19]

Peters

[11] Patent Number: 4,596,839

[45] Date of Patent: Jun. 24, 1986

[54] ELASTOMER PTFE COMPOSITION

[76] Inventor: William E. Peters, 1004 Richwood Dr., Danville, Ind. 46122

[21] Appl. No.: 642,128

[22] Filed: Aug. 17, 1984

Related U.S. Application Data

[63] Continuation-in-part of Ser. No. 499,349, May 31, 1983, abandoned, which is a continuation-in-part of Ser. No. 309,230, Sep. 16, 1981, abandoned.

[51] Int. Cl.[4] .................. B05D 5/08; C08K 3/10
[52] U.S. Cl. .................. 523/175; 524/406; 524/520; 525/199
[58] Field of Search ............ 523/175; 524/406, 520; 525/199

[56] References Cited

U.S. PATENT DOCUMENTS

| | | | |
|---|---|---|---|
| 2,951,721 | 9/1960 | Asp | 288/16 |
| 3,230,919 | 1/1966 | Crawford | 114/67 |
| 3,293,203 | 12/1966 | Paulus | 260/37 |
| 3,575,123 | 4/1971 | Shepherd | 114/67 R |
| 3,585,953 | 6/1971 | Kramer | 114/67 |
| 3,775,832 | 12/1973 | Werra | 29/450 |
| 3,878,031 | 4/1975 | Dormer | 428/365 |
| 3,940,455 | 2/1976 | Kaufman | 525/199 |
| 3,990,381 | 11/1976 | Shepherd et al. | 114/67 R |
| 4,040,636 | 8/1977 | Albertson et al. | 277/188 |
| 4,073,983 | 2/1978 | Van Cleave | 427/421 |
| 4,075,158 | 2/1978 | Coale | 260/42.17 |
| 4,088,622 | 5/1978 | Pearl | 260/32.8 R |
| 4,088,623 | 5/1978 | Pearl | 260/37 AL |
| 4,129,550 | 12/1978 | Nametkin et al. | |
| 4,215,178 | 7/1980 | Martin, Jr. | |
| 4,241,682 | 12/1980 | Konstandt | 114/67 R |

FOREIGN PATENT DOCUMENTS

| | | |
|---|---|---|
| 62861 | 5/1975 | Australia . |
| 2050794 | 3/1971 | France . |
| 757039 | 9/1956 | United Kingdom . |

OTHER PUBLICATIONS

Johnson, James, "For Elastomers . . . a Fluorocarbon Internal Lubricant," Liquid Nitrogen Processing Corp., Malvern, Pennsylvania, Reprinted from Rubber Age.

Primary Examiner—Joseph L. Schofer
Assistant Examiner—N. Sarofim
Attorney, Agent, or Firm—Willian Brinks Olds Hofer Gilson & Lione

[57] ABSTRACT

A composition is disclosed containing particulate polytetrafluoroethylene in amounts from 15 percent by weight to 80 percent by weight incorporated in an elastomer with an amount of molybdenum disulfide effective to permit its manufacture and in some cases lend its properties, and methods for preparing such compositions and for using molybdenum disulfide, and fibrillated particulate polytetrafluoroethylene to improve compositions and products are also disclosed.

24 Claims, No Drawings

ELASTOMER PTFE COMPOSITION

This is a continuation-in-part of U.S. patent application Ser. No. 499,349 filed May 31, 1983, now abandoned which, in turn, is a continuation-in-part of U.S. patent application Ser. No. 309,230 filed September 16, 1981, now abandoned.

BACKGROUND OF THE INVENTION

This invention relates to a new composition, articles comprised of the composition and methods of manufacture. More particularly, this invention relates to an elastomer-polytetrafluoroethylene composition, its method of manufacture, and articles manufactured with such a composition having remarkably increased durability in their applications.

It has long been a desire to combine the properties of an elastomer, such as rubber, and polytetrafluoroethylene, referred to frequently as PTFE. Past efforts to manufacture compositions with beneficial combined properties have not been wholly successful. In addition, the past attempts to incorporate PTFE into rubber, for example, have been generally limited to attempts and compositions containing no more than 20 percent by weight of PTFE. Such compositions have failed to provide a sufficient combined benefit from the properties of PTFE and elastomers to have great commercial importance. Higher percentages of PTFE could not be obtained because of the inability to uniformly mix the PTFE particulate matter with the elastomer composition. It is believed the difficulty of obtaining uniform mixtures and higher percentages of PTFE were the result of PTFE's unique properties, and probably the properties of its surface which resist wetting. Because of these properties, uniform mixing and bonding of PTFE particulate material and natural and synthetic rubbers have not been achieved in compositions with any commercially significant incorporation of PTFE.

SUMMARY OF THE INVENTION

This invention is based on the discovery of a new composition, including an elastomer, for example, a natural or synthetic rubber, polytetrafluoroethylene, and an amount of molybdenum disulfide effective to provide a uniform mixing of the polytetrafluoroethylene and the elastomer. Such new compositions can comprise about 25–80 percent polytetrafluoroethylene, about 1–30 percent molybdenum disulfide, and the balance of an elastomer. Preferably, the new compositions include about 2 percent to about 6 percent of polytetrafluoroethylene that is fibrillatable and fibrillated in the composition. New compositions including about 2 percent to about 6 percent of such fibrillated PTFE, an effective amount of molybdenum disulfide, and an elastomer, such as natural or butyl rubber, can provide compositions with exceptional durability and life without loss of their elastic and frictional characteristics, with a total polytetrafluoroethylene contents of up to about 12 percent.

Compositions and products of the invention have the advantages of many of the unique properties of polytetrafluoroethylene combined with the advantageous properties of elastomers. Among the properties of PTFE that may be realized in such compositions and products are chemical inertness and stability, insolubility, heat resistance, and surface lubricity and abrasion resistance; and these properties may be incorporated into an elastic article or product. The invention may be considered as permitting the advantages of the unique properties of elastomers to be imparted to polytetrafluoroethylene, the most advantageous of such properties being elasticity and "memory," recovery from deformation.

The invention is particularly effective in increasing the life of products that are exposed to repeated flexure through the application of compression and tensile forces. Even small amounts, i.e., 2 percent to 6 percent, of fibrillated PTFE uniformly mixed in elastomer compositions can provide unexpected increases in durability and life. In such applications, elastomeric products particularly fail through the accumulative effects of heat generated within the products as a result of such recurrent forces; that is, such products frequently fatigue and fail through the heat loss represented by the hysteresis of their elastic deformation. It is believed that internally generated heat, probably the result of internal friction accompanying the flexure of the elastomeric material, effects a gradual change in the composition, particularly in its physical properties, and provides a progressive failure. With compositions of the invention, products subject to such fatigue failures can be manufactured with useful lives several times those of products manufactured with prior elastomeric compositions. Such products include automobile and aircraft tires, pads for the tracks in military tanks, shock absorbers, O-rings, and the like. Where lubricity is undesirable, such as in the manufacture of tires for automobiles, aircraft, and other vehicles, the total PTFE content of the composition is preferably less than about 12 percent. However, the invention also permits an elastic product having a lubricious surface and can provide particularly effective O-rings, bearing-seals and the like.

Thus, this invention is also based on the discovery that the form of the particulate polytetrafluoroethylene can be of particular importance in improving elastomers, such as EPsyn 55 sold by Copolymer Rubber & Chemical Corporation and silicone rubber, having low tensile strengths and low moduli of elasticity, and particularly that small amounts of fibrillated PTFE, such as TEFLON K-10 sold by E. I. DuPont de Nemours and FLUON CD1 sold by ICI Americas, when mixed into such elastomers, can improve their tensile strength or their moduli of elasticity or both, particularly at high temperatures, both in the presence of PTFE in other forms and in the base elastomers. It has been discovered that fibrillated PTFE is so effective in such compositions that only a small weight percentage of about 4 percent (i.e., 2–6 percent) is necessary to achieve the substantial benefits of the component. Such small amounts of fibrillated PTFE can even significantly improve the moduli of elasticity of elastomers with high tensile strengths, such as nitrile rubber and butadiene acrylonitrile, and again this improvement in the modulus of elasticity continues at elevated temperatures. Products where such improved compositions are important include, for example, O-rings, lip seals for hydraulic and pneumatic cylinders, seals for pumps, valves, and other such hydraulic components.

It should be understood that reference to "fibrillated PTFE" in this and my prior applications means PTFE that is fibrillated in the body of my composition. Such "fibrillated PTFE" is manufactured as a coagulated dispersion polymer which may fibrillate under shear and is thus capable of fibrillation. As purchased, the fibrillated PTFE are coagulated dispersion polymer particles. FLUON CD1 manufactured by ICI Americas, Inc., is one such fibrillated PTFE. Such PTFE is preferably added to the mixer as purchased after being mixed with particulate molybdenum disulfide and fibrillated as it is mixed with the other components of the composition.

The invention permits a combination of the physical properties of elastomers and PTFE to obtain their desirable physical properties and permits the development of new products with strikingly improved durability and performance in many applications.

It has been discovered that the presence of effective amounts of molybdenum disulfide will permit the manufacture of such compositions with significant and effective combinations of polytetrafluoroethylene and elastomers. It is believed that the molybdenum disulfide permits elastomers to wet the extensive surface of particulate polytetrafluoroethylene, permitting the intimate dispersion and mechanical interaction of the elastomer and PTFE in percentages of polytetrafluoroethylene which can be greater than 25 percent by weight of the total composition.

It has also been discovered that effective amounts of molybdenum disulfide will permit the intimate mixing of solid components with elastomers with a reduced heat buildup and a reduced loss of elastomer scorch safety, not only with PTFE particulate matters but with other particulate matter, including granular, flaked and powdered fillers and fibrous materials such as cotton and rayon fibers. Compositions of this invention are thus the result of a method comprising mixing together an elastomer, such as natural or synthetic rubber, particulate material, preferably including PTFE powders capable of fibrillation, and an amount of molybdenum disulfide that is effective to uniformly incorporate the particulate material, and most particularly the fibrillated PTFE, in the elastomer material. Effective amounts of molybdenum disulfide premixed with particulate PTFE lie in the range from about 3 percent to about 30 percent by weight of the composition, and are determined by addition to the composition as it is being mixed. The amount of molybdenum disulfide which is effective appears to depend upon the quality and nature of the particulate material and the quantity of molybdenum disulfide. In making a composition with lower amounts of polytetrafluoroethylene, e.g., about 2-6 percent of fibrillated PTFE, the amount of molybdenum disulfide may be approximately equal to about 1.25 parts of molybdenum disulfide per part of fibrillated PTFE. Where the particulate PTFE in the composition is not in fibrillated form, about 0.75 parts of molybdenum disulfide per part of PTFE may be used. At higher amounts of polytetrafluoroethylene, e.g., about 35-40 percent, the amount of molybdenum disulfide can be substantially reduced to the range of 0.5 to 0.6 parts of molybdenum disulfide per part of PTFE.

A number of products may be molded from compositions resulting from such a method of manufacture and cured (or vulcanized) to provide an elastic solid product with improved physical properties as a result of the quantity of particulate material such as polytetrafluoroethylene incorporated into the composition of the product.

One product of this invention comprises an improvement for watercraft and a method for enhancing efficient movement through water, an outer hull covering for such watercraft comprising a layer made of a composition containing about 25-80 percent polytetrafluoroethylene, about 1-30 percent molybdenum disulfide, and the balance of an elastomeric material. In this context, all percentages in this application are given by weight of the total composition unless otherwise indicated.

In its most preferred form, this covering layer and method were prepared as a substantially homogenous combination of about 50 percent reprocessed polytetrafluoroethylene powder, about 20 percent molybdenum disulfide, and the balance (about 30 percent) of ethylene-propylene terpolymer as the base elastomer. The composition was cured by standard procedures to form a layer having a preferred thickness of about one-half inch. The layer material was pressed, formed, and cut into patterned sheets which were later assembled to form a continuous, adherent covering on a metal substrate such as the outer hull or surface of a watercraft.

The preferred layer material provides a hard, durable, and resilient covering that requires little maintenance and provides improved sound insulation and ease of repair. It provides anti-fouling assistance and enhances speed and energy efficiency by substantially lowering the coefficient of friction of the outer surface and reducing drag due to water resistance to movement by the watercraft. Its uses are broad, including all types and sizes of watercraft and other structures from rowboats and surfboards to sailboats, ocean liners, tankers, conventional and atomic-powered submarines and other military vessels and to wharfs, docks, buoys, and the like. Other uses include as sound mountings for various types of equipment and as O-ring seals, valves, fittings, and many uses in the rubber industry. The substrate or surface to which applicant's covering layer adheres can be metal, natural or synthetic rubber, plastic, fiberglass, concrete, wood or other material.

Related objects and advantages of the present invention will be apparent from the following more detailed description.

DESCRIPTION OF THE PREFERRED EMBODIMENTS

For purposes of promoting an understanding of the principles of the invention, reference will now be made to the preferred embodiments; and specific language will be used to describe the same. It will nevertheless be understood that no limitation of the scope of the invention is thereby intended, such alterations and further modifications of such embodiments, and such further applications of the principles of the invention being contemplated as would normally occur to one skilled in the art to which the invention relates.

The invention permits the modifications of the physical properties of elastomeric materials, and particularly rubber and synthetic rubber, and in some applications, such as an outer hull covering as a result loading in the base elastomeric material at least about 25 percent polytetrafluoroethylene and an amount of molybdenum disulfide. In another sense, with high PTFE percentages, the invention can be considered as lending the elasticity and memory of elastomeric materials to a material with polytetrafluoroethylene properties.

In a preferred form, the composition of the invention contains about 25-80 percent polytetrafluoroethylene, about 1-30 percent molybdenum disulfide, and the balance of an elastomeric material; a still more preferred composition range for the components of this invention is about 25-50 percent polytetrafluoroethylene, about 3-20 percent molybdenum disulfide, and the balance of elastomeric material. A preferred composition for exposure to sea water contains 50 percent polytetrafluoroethylene, about 20 percent molybdenum disulfide, and the remaining about 30 percent of a base elastomer comprising ethylene-propylene terpolymer resin. A portion, preferably no more than about 4 percent, of the PTFE may be fibrillated PTFE.

Ethylene-propylene terpolymer resin is a synthetic rubber and is known for its versatility and resistance to long-term water immersion, and particularly for its resistance to degradation by sea water. It is readily vulcanized, using, for example, a sulfur and peroxide curing agent and has been used in the past for such things as automotive parts, cable coatings, hoses, footwear, and other products. The specific ethylenepropylene terpolymer compound usable in such compositions is a NORDEL brand marketed by E. I. DuPont de Nemours Co., Inc. Such a composition is particularly preferred for use in sea water and in such applications as outer hull coverings for watercraft. Other elastomers work as a base material, particularly with other applications. For example, natural rubber works as an effective base material for use in fresh water.

Polytetrafluoroethylene may be that commonly known by the federally registered trademark TEFLON which is the name for compounds marketed by E. I. DuPont de Nemours Co., Inc.; FLUON which is the name for compounds marketed by ICI Americas; and WHITCON 2 which is the name of a particulate powder marketed by ICI Americas. Such materials are recognized for heat resistance and friction-reduction as when used, for example, on the surfaces of kitchen utensils and for other mechanical applications. Such materials are available in various forms. This more common form of particulate PTFE is manufactured by grinding or fracturing larger PTFE particles into powdered particulate PTFE. A base elastomer can be, for example, loaded with a reprocessed polytetrafluoroethylene in the form of a cryogenically ground powder. TL-115A is a specifically usable compound and is a trademark designation for the compound manufactured by LNP Corp. of Malvern, Pennsylvania, and marketed by HARDWICK of 60 S. Seiberling Street, Akron, Ohio 44305. TL-115A is known for its bearing characteristics as an additive in thermoplastic and thermoset polymeric systems. It has an irregular particle shape ranging in size from about 2–45 microns, although particles substantially larger in size up to at least about 75–100 microns work in applicant's invention without appreciably affecting surface texture or drag coefficient; for example, in the hull coverings for watercraft. As previously stated, the amount of polytetrafluoroethylene loading in a preferred composition varies from the broad range of at least about 25 percent to an amount of about 50 percent which is presently most preferred as a covering layer for use in sea water. One characteristic of this most preferred composition is its hardness of about 80–90 durometer which is beneficial not only for durability, but also for drag coefficient and sound attenuation properties.

The third component of the composition of this invention is molybdenum disulfide in the preferred ranges previously specified. The specific molybdenum disulfide is technical grade powder in the form of flat crystals which are added to the base elastomer and the polytetrafluoroethylene components to arrive at the final composition. Of course, alternate embodiments can include fillers such as conventional pigments and others; and the same are within the scope and contemplation of applicant's invention as disclosed and claimed herein.

The method of preparing one preferred composition is first to combine the various dry ingredients to arrive at a substantially homogeneous combination. A curing agent is added, and the mixture is placed in a reaction vessel appropriate for vulcanizing resins of this type. The component is cured, i.e., vulcanized, using standard procedures by applying heat and pressure for a specified period of time. A standard 24"×24" O-ring press can be used to cure the compound in the shape of a flattened layer or sheet. In commercial use, the material can be calendered or otherwise pressed and cured into appropriately sized sheet stock from which modular panels can be cut or otherwise shaped.

In making such compositions with fibrillated PTFE, the fibrillated PTFE, such as ICI Americas's FLUON CD1, or DuPont's TEFLON K-10, is preferably added to the mixer (e.g., a Banbury mill) as purchased, that is, in particulate form. In mixing of the composition, this PTFE component of the composition is fibrillated uniformly in the composition; and it lends surprising durability to the composition and strengthens many elastomer components that are made from such compositions.

For the purpose of promoting a better understanding of the invention, the following examples are given of specific compositions of the invention and their methods of preparation.

EXAMPLE 1

A 100 g amount of applicant's composition was compounded by combining 50 percent by weight TL-115A polytetrafluoroethylene powder with 20 percent by weight molybdenum disulfide crystals and with 30 percent by weight NORDEL ethylene-propylene terpolymer resin in a container. The dried ingredients were thoroughly blended to arrive at a substantially homogeneous mixture, and a standard peroxide curing agent was added. The compound was placed in an O-ring press having a 24-inch square bed and was heated for ten minutes at 350° F. The resulting vulcanized sheet material was dark grey in color, was 0.1 inch thick and tested at a hardness level of 85–90 durometer.

EXAMPLE 2

A 100 g amount of applicant's composition was compounded by combining 25 percent by weight TL-115A polytetrafluoroethylene powder with three percent by weight molybdenum disulfide and 72 percent by weight NORDEL ethylene-propylene terpolymer resin. The ingredients were blended and cured as in Example 1. Several ring-shaped pieces were molded from this material and were found to work effectively as O-rings in various mechanical applications.

EXAMPLES 3, 4, 5, 6, 7, 8

The effect of inclusion of the invention in ethylene propylene terpolymer elastomers, such as Copolymer Rubber & Chemical Corporation's EPsyn ®55, can be observed from the following examples and tests. Composition samples were prepared with 100 parts of the base elastomer mixture which included 100 parts of a composition sold by Copolymer Rubber & Chemical Corporation under its registered trademark EPsyn 55 and other standard ingredients of such elastomer compositions. Example 3 sets forth the test of this composition for comparison with the invention. In the composition of Example 4, 50 parts of particulate PTFE, such as WHITCON 2 of ICI Americas, was added to the basic elastomer mixture of Example 3 with an effective amount of molybdenum disulfide. In Example 5, 100 parts of WHITCON 2 were added to the basic elastomer mixture of Example 3 with an effective amount of molybdenum disulfide. In Example 6, four parts of fibrillated PTFE, such as FLUON CD1 sold by ICI Americas, was added to the basic elastomer mixture of Example 3 with an effective amount of molybdenum disulfide. In Example 7, 46 additional parts of particulate PTFE, such as WHITCON 2, were added to the mixture of Example 6 with an effective amount of molybdenum disulfide to make a total of 50 parts of PTFE in the composition. In Example 8, 96 additional parts of WHITCON 2 were added to the composition of Example 6 with an effective amount of molybdenum disulfide to provide a total of 100 parts of PTFE in the composition. The physical properties, tensile strength, elongation, modulus, and hardness of the compositions of Examples 3-8 are presented in the table below.

late polytetrafluoroethylene such as WHITCON 2 and an effective amount of molybdenum disulfide. Example 11 is the mixture of the silicone rubber composition of Example 9 with four parts of fibrillated PTFE, such as FLUON CD1 and an effective amount of molybdenum disulfide. Example 12 is the silicone rubber-fibrillated PTFE mixture of Example 11 with 96 additional parts of particulate PTFE such as WHITCON 2 and an effective amount of molybdenum disulfide. The physical properties of the compositions of Examples 9-12 are presented below.

| EXAMPLE | 9 | 10 | 11 | 12 |
| --- | --- | --- | --- | --- |
| Rheograph Properties Model 100 320° F. 60 Minute Motor | | | | |
| Min. Torque, in.-lbs. | 22.2 | 16.6 | 23.0 | 14.5 |
| Max. Torque, in.-lbs. | 57.8 | 45.8 | 38.0 | 29.7 |
| T2' minutes | 1.1 | 1.1 | 1.6 | 1.2 |
| T90' minutes | 4.3 | 4.9 | 4.7 | 4.2 |
| Press Cure @ 320° F. | | | | |
| Tensile, psi | | | | |
| @ RT | 6' 800 | 475 | 2575 | 275 |
| @ 300° F. | 6' 500 | 350 | 400 | 200 |
| Elongation, % | | | | |
| @ RT | 100 | 110 | 50 | 20 |
| @ 300° F. | 70 | 90 | 40 | 40 |
| 100% Modulus, psi | | | | |
| @ RT | 800 | 425 | — | — |
| @ 300° F. | — | — | — | — |
| Hardness, Shore A @ RT | 80 | 82 | 80 | 79 |

| EXAMPLE | | 3 | 4 | 5 | 6 | 7 | 9 |
| --- | --- | --- | --- | --- | --- | --- | --- |
| Rheograph Properties Model 100 320° F. 30 Minute Motor | | | | | | | |
| Min. Torque, in.-lbs. | | | 9.1 | 9.5 | 10.7 | 9.7 | 11.0 | 12.0 |
| Max. Torque, in.-lbs. | | | 60.0 | 59.5 | 60.8 | 89.2 | 88.5 | 89.4 |
| T2' minutes | | | 3.0 | 3.1 | 3.2 | 3.0 | 2.8 | 2.7 |
| T90' minutes | | | 17.8 | 14.5 | 13.2 | 19.0 | 16.7 | 16.7 |
| | Press Cure @ 320° F. | | | | | | |
| Tensile, psi | | | | | | | |
| @ RT | 15' | 725 | 1075 | 900 | 1075 | 1025 | 875 |
| @ 300° F. | 15' | 350 | 425 | 400 | 500 | 475 | 450 |
| Elongation, % | | | | | | | |
| @ RT | | 220 | 470 | 410 | 380 | 400 | 370 |
| @ 300° F. | | 110 | 160 | 140 | 110 | 150 | 150 |
| 100% Modulus, psi | | | | | | | |
| @ RT | | 475 | 325 | 325 | 500 | 475 | 450 |
| @ 300° F. | | 325 | 350 | 350 | 475 | 425 | 400 |
| Hardness, Shore A @ RT | | 67 | 69 | 69 | 70 | 71 | 75 |

As can be determined from comparison of this data, the tensile strength at room temperature and at 300° F. of the composition of Examples 4-8 are substantially improved compared with the basic elastomer mixture of Example 3. Furthermore, the inclusion of only four parts of fibrillated PTFE in such compositions will provide them with tensile strength at room temperature and at 300° F. which is substantially better than the basic elastomer mixture, and the improvement in tensile strengths of the compositions with fibrillated PTFE are particularly significant at elevated temperatures such as 300° F. In addition to the significant improvement in the tensile strengths of such elastomer mixtures, the inclusion of four parts of fibrillated PTFE in the compositions of Examples 6-8 substantially improve the modulus level elasticity of the composition, both at room temperature and at 300° F. Elongation of the compositions of Examples 4-8 is also substantially improved.

EXAMPLES 9, 10, 11, AND 12

The effect of the invention in silicone elastomer compositions is shown in a comparison of Examples 9-12 and the results of their testing. Example 9 is a silicone rubber composition including additives. Example 10 is a composition including the silicone rubber composition of Example 9 with the addition of 100 parts of particu- These compositions demonstrated chemical inertness, stability, heat resistance, surface lubricity, and abrasion resistance; however tests have been sparse and their results are not yet conclusive as to improvement of the physical properties of silicone elastomer compositions. Silicone elastomer compositions of this invention should be tested for tensile strength, elongation, and modulus of elasticity where these properties are important prior to their application in specific products.

EXAMPLES 13, 14, 15, 16, 17, AND 18

Examples 13–18 permit a comparison of the effect of the invention in nitrile rubber compositions, such as Copolymer Rubber & Chemical Corporation's COPO 1500. Example 13 is a standard nitrile rubber mixture including 100 parts of nitrile rubber. Example 14 is the nitrile rubber mixture of Example 13 with 50 parts of a particulate PTFE such as WHITCON 2 and an effective amount of molybdenum disulfide. Example 15 is the nitrile rubber mixture of Example 13 with 100 parts of particulate PTFE such as WHITCON 2 and an effective amount of molybdenum disulfide. Example 16 is the nitrile rubber mixture of Example 13 with four parts of a fibrillated PTFE such as FLUON CD1 and an effective amount of molybdenum disulfide. Example 17 is the nitrile rubber-fibrillated PTFE mixture of Example 16 with an additional 46 parts of particulate PTFE such as WHITCON 2 and an effective amount of molybdenum disulfide. Example 18 is the nitrile rubber-fibrillated PTFE mixture of Example 16 with an additional 96 parts of PTFE such as WHITCON 2 and an effective amount of molybdenum disulfide. The physical properties of the compositions of Examples 13–18 are compared in the table below.

Comparison also demonstrates the significantly improved tensile strength at such elevated temperatures as 300° F. with the incorporation of four parts of fibrillated PTFE and 50 to 100 parts of total PTFE.

EXAMPLES 19, 20, 21, 22, 23, AND 24

Examples 19–24 permit a comparison of the effect of the invention in butadiene acrylonitrile elastomers. Example 19 is an elastomer mixture including 100 parts of butadiene acrylonitrile elastomer. Example 20 is the butadiene acrylonitrile elastomer mixture of Example 19 with 50 parts of particulate PTFE such as WHITCON 2 and an effective amount of molybdenum disulfide. Example 21 is the butadiene acrylonitrile mixture of Example 19 with 100 parts of particulate PTFE such as WHITCON 2 and an effective amount of molybdenum disulfide. Example 22 is the butadiene acrylonitrile mixture of Example 19 with four parts of fibrillated PTFE such as FLUON CD1 and an effective amount of molybdenum disulfide. Example 23 is the butadiene acrylonitrile elastomer-fibrillated PTFE mixture of Example 22 with an additional 46 parts of particulate PTFE such as WHITCON 2 and an effective amount of molybdenum disulfide. Example 24 is butadiene acrylonitrile elastomer-fibrillated PTFE mixture of Example

| EXAMPLE | | 13 | 14 | 15 | 16 | 17 | 18 |
|---|---|---|---|---|---|---|---|
| Rheograph Properties Model 100 320° F. 30 Minute Motor | | | | | | | |
| Min. Torque, in.-lbs. | | 9.8 | 10.1 | 10.4 | 10.3 | 11.0 | 11.7 |
| Max. Torque, in.-lbs. | | 48.9 | 47.6 | 45.7 | 50.0 | 49.0 | 46.9 |
| T₂' minutes | | 3.5 | 3.9 | 4.1 | 3.9 | 3.9 | 3.8 |
| T₉₀' minutes | | 11.7 | 12.3 | 13.8 | 13.9 | 14.2 | 16.4 |
| | Press Cure @ 320° F. | | | | | | |
| Tensile, psi | | | | | | | |
| @ RT | 12' | 3275 | 2650 | 2050 | 3000 | 2350 | 1900 |
| @ 300° F. | 12' | 1000 | 675 | 550 | 850 | 875 | 575 |
| Elongation, % | | | | | | | |
| @ RT | | 540 | 530 | 470 | 500 | 460 | 420 |
| @ 300° F. | | 490 | 380 | 360 | 330 | 370 | 330 |
| 300% Modulus, psi | | | | | | | |
| @ RT | | 1500 | 1275 | 1125 | 1800 | 1550 | 1350 |
| @ 300° F. | | 575 | 525 | 475 | 800 | 725 | 525 |
| Hardness, Shore A @ RT | | 66 | 69 | 70 | 68 | 69 | 74 |

Comparisons of the composition properties demonstrate the increased modulus of elasticity that is obtained with the addition of only four parts of fibrillated PTFE in nitrile rubber compositions of the invention.

22 with an additional 96 parts of particulate PTFE such as WHITCON 2 and an effective amount of molybdenum disulfide. The compositions of Examples 19–24 are compared below.

| EXAMPLE | | 19 | 20 | 21 | 22 | 23 | 24 |
|---|---|---|---|---|---|---|---|
| Rheograph Properties Model 100 320° F. 30 Minute Motor | | | | | | | |
| Min. Torque, in.-lbs. | | 5.1 | 4.0 | 4.8 | 5.1 | 4.9 | 5.4 |
| Max. Torque, in.-lbs. | | 29.8 | 23.3 | 23.6 | 31.2 | 26.8 | 24.8 |
| T₂' minutes | | 5.8 | 6.0 | 6.1 | 4.6 | 4.3 | 4.2 |
| T₉₀' minutes | | 9.8 | 10.5 | 9.4 | 9.3 | 8.7 | 7.7 |
| | Press Cure @ 320° F. | | | | | | |
| Tensile, psi | | | | | | | |
| @ RT | 10' | 3800 | 2475 | 1825 | 3250 | 2275 | 1575 |
| @ 300° F. | 10' | 525 | 425 | 425 | 675 | 525 | 425 |
| Elongation, % | | | | | | | |
| @ RT | | 690 | 640 | 580 | 620 | 560 | 500 |
| @ 300° F. | | 320 | 340 | 360 | 280 | 280 | 270 |
| 200% Modulus, psi | | | | | | | |

-continued

| EXAMPLE | 19 | 20 | 21 | 22 | 23 | 24 |
|---|---|---|---|---|---|---|
| @ RT | 450 | 350 | 325 | 825 | 700 | 600 |
| @ 300° F. | 300 | 250 | 225 | 525 | 400 | 325 |
| Hardness, Shore A @ RT | 61 | 65 | 66 | 66 | 66 | 70 |

With the butadiene acrylonitrile rubber mixture as with the nitrile rubber mixture, the incorporation of as little as four parts of fibrillated PTFE in the composition imparts significant improvement in the modulus of elasticity both at room temperature and at elevated temperatures such as 300° F. In addition, the incorporation of four parts of fibrillated PTFE improves the tensile strength of such compositions at elevated temperatures such as 300° F.

EXAMPLE 25

A composition was made with 100 parts of EPsyn 4506 (a trademark of Copolymer Rubber & Chemical Corporation), 45 parts of TL 115A polytetrafluoroethylene powder, 50 parts of technical grade molybdenum disulfide particles, 30 parts of HiSil 233, 1 part of TEA, 12 parts of Saret 500 and 5 parts of Varox. The ingredients were mixed together and cured and formed into test samples and tested in accordance with ASTM standards.

The composition demonstrated a Compound ML 1+4 at 212° F. of 94, and a Mooney Scorch, at 270° F., of 9.4 minutes for a 5 point rise and a minimum reading of 54. After pressing and curing at 320° F., a tensile strength of 1400 psi, an elongation of 230 percent, a 100 percent modulus of 750 psi, a 200 percent modulus of 1250 psi and a hardness Shore A of 81 were obtained at room temperature.

EXAMPLE 26

A composition was made with 100 parts of EPsyn 4506 (a trademark of the Copolymer Rubber & Chemical Corporation), 40 parts of TL-115A, 7.5 parts of TEFLON K-10, 30 parts of technical grade molybdenum disulfide, 40 parts of HiSil 233, 15 parts of Saret 500, 9 parts of Dicup 40KE, 5 parts of FEF Block, and 1 part of TEA. The ingredients were mixed together and cured and formed into test samples and tested in accordance with ASTM standards.

The composition demonstrated a Compound ML 1+4 at 212° F. of 108 and a Mooney Scorch, at 270° F., of 3.8 minutes for a 5 point rise and a minimum reading of 48. After pressing and curing at 320° F., a tensile strength of 2050 psi, an elongation of 150 percent, a 100 percent modulus of 1625 psi, and a hardness Shore A of 91 were obtained at room temperature.

Thus, elastomers usable with this invention include the polymers known generally as rubbers, including natural rubber and synthetic rubber elastomers, and other polymers capable of forming elastic solids with similar properties. More specifically, such elastomers include, in addition to natural rubber, styrene-butadiene rubber (SBR BUNA S), acrylonitrilebutadiene rubber (BUNA N), butyl rubber (IIR), ethylenepropylene rubber (EPDM), polyurethane elastomers (AU), cis-polybutadiene (BR), polychloroprene (Neoprene, CR), poly(epichlorohydrin) (CO), polyacrylate (ABR), silicone rubbers (SI), poly (fluorinated hydrocarbons) (FPM), olefin polysulfide (Thiokol, ET), poly isoprene (IR), and the like. The compositions of the invention can also include plasticizers and softeners, extenders, reclaimed rubber, inert fillers, reinforcing fillers, coloring materials, anti-oxidants, accelerators, and vulcanization actuators.

The particulate polytetrafluoroethylene used can be ground polytetrafluoroethylene, dispersion-type polytetrafluoroethylene capable of fibrillation or a blend of both ground and fibrillatable PTFE. Such PTFE materials are sold by the following companies under their respective trademarks:

| | Trade Designation | Manufacturer |
|---|---|---|
| Ground PTFE: | TL 115A | LNP Corp. |
| | WHITCON 2 | ICI Americas |
| Fibrillatable PTFE: | FLUON CD1 | ICI Americas |
| | TEFLON K-10 | DuPont |

Compositions of the invention can include both ground and fibrillated polytetrafluoroethylene. Fibrillated polytetrafluoroethylene improves significantly the modulus of elasticity of most elastomers and can improve the tensile strength of elastomers with low tensile strengths. Generally, with about 4 percent weight of fibrillated PTFE, about 85 percent of its benefits can be obtained. It is believed that the more extended and complex surface of the fibrillated PTFE may provide additional mechanical entanglement and engagement with the elastomer. The improved tensile strength and modulus can be obtained in many cases with only a modest increase in the hardness and a modest reduction in the elasticity.

Fibrillated PTFE is the result of its manufacture from polymer emulsions and in its fibrous form, in the compositions of this invention can resemble small twisted and deformed webs of entangled fibers. FLUON CD1 is preferred over TEFLON K-10 because it seems to disperse more readily in the elastomer.

Particulate PTFE is generally finely ground and is the result of fracturing. It is believed that the performance of ground particulate PTFE in compositions of this invention may be improved if it is etched with sodium in processing. The improvement believed to be available with such treatments are improved mechanical interaction of the elastomer and particulate PTFE in compositions and products of the invention, and possibly improved tensile strength and modulus of elasticity. Ground PTFE can, however, effectively contribute the physical properties of polytetrafluoroethylene in products that do not require good tensile strength and modulus. The outer hull covering, for example, does not require these properties.

Where tensile properties are important, small amounts of fibrillated PTFE are desirably included to improve the tensile strength and modulus of most elastic products made with compositions of this invention. Products with increased tensile strength and modulus of elasticity generally have greater abrasion resistance, lower flexural hysteresis, or heat build-up in use, and increased durability where subjected to mechanical flexing and abrasion. The interaction of the fibrillated PTFE and the ground PTFE within the elastomer is not understood; but it is as if the PTFE component of such compositions yields readily when the rubber is exposed to tensile and compressive forces up to a point, and then contributes to the tensile strength and modulus of the composition as a result of the mechanical engagement of the PTFE with the elastomer in the matrix when stretched and contributes to the hardness as the PTFE component comes to bear the load when compressed.

The procedure for determining the quantity of PTFE needed in many applications is first to determine the total quantity of PTFE that is desirable to achieve the PTFE properties of the composition that are desired, such as lubricity and abrasion resistance, solvent resistance and chemical inertness, heat resistance and the like. The modulus of elasticity of the composition can generally be improved without substantial deterioration of other properties by using, as a portion of the PTFE component, fibrillatable PTFE such as FLUON CD1 and TEFLON K 10.

In composition, where lubricity is disadvantageous, such as the treads of vehicle tires and military tank pads, quantities of fibrillated PTFE on the order of only about 4 percent by weight are needed within the composition to achieve 85 percent of the improvement possible with the fibrillated PTFE. In tire compositions, for example, about 2 percent of fibrillated PTFE in natural rubber with up to no more than 10 percent ground PTFE can provide substantially increased life to vehicle tires without loss of their tractability. With elastomers having less strength such as butyl rubber up to about 6 percent of fibrillated PTFE with no more than 6 percent ground PTFE can provide increased life and durability. It is generally desirable to keep the quantity of fibrillated PTFE in such compositions as low as possible consistent with obtaining the needed properties. Fibrillatable PTFE is more difficult to mix with elastomers and generates more heat as it is mixed with the elastomers. The increased heat generated in mixing the components of a composition and fibrillating the PTFE component, for example, in a Banbury mixer tends to partially cure the elastomer during mixing and reduces the scorch resistance of the resulting composition on molding. Scorch resistance is a measure of the ability of an elastomeric composition to be uniformly curable and to resist a preferential curing at the surfaces of a mold into which heat is transferred. Such preferential curing generally increases the resistance of the cured portion of the product to heat transfer and inhibits uniform curing of the product interior without over heating adjacent the product surface. In this regard, FLUON CD1 seems to be preferable to TEFLON K-10; but both work well in the resulting composition. In addition, particulate PTFE having an average particle size of less than 40 microns is more readily dispersed.

The molybdenum disulfide used may be that sold, for example, by ICI Americas as technical grade molybdenum disulfide. While the effective amount of molybdenum disulfide may vary from composition to composition, the amount needed to effect uniform dispersion of particulate matter such as PTFE into the elastomer may be easily determined by adding the molybdenum disulfide to the combined elastomer, and polytetrafluoroethylene in the Banbury mixer until the PTFE becomes uniformly mixed with the elastomer. The molybdenum disulfide can be incorporated into compositions of this invention in many cases with only a minor effect on most of their physical properties.

In addition to permitting the uniform dispersion of significant amounts of particulate material and especially PTFE in elastomeric materials, the molybdenum disulfide can function as a significant filler for the elastomer and can be used to contribute lubricity to the surface properties of a resulting elastic product. Furthermore, the molybdenum disulfide will reduce the heat buildup and partial curing of the elastomer during mixing of the composition and increase its scorch resistance.

Compositions of this invention and their advantages are believed to be derived in part from a matrix-like structure including an intimate mechanical interengagement of elastomer with particulate PTFE, and, where fibrillated PTFE is incorporated, in web-like structures of fibrillated PTFE within the matrix. The molybdenum disulfide is also uniformly dispersed in the elastomer matrix.

Where elastic products of such compositions are subject to surface abrasion, for example, in applications such as lip seals for hydraulic and air pump shaft seals, vane pump seals, valve seals, and the like, the elastomer at the surface may be abraded; but the surface exposed to abrasion can then become predominantly PTFE which is lubricious and highly abrasion resistant. To the extent PTFE is abraded from such elastic products by the roughness of opposed surfaces, such as the inner steel surfaces of hydraulic and compressed air cylinders, pumps, valves, etc., the transfer of PTFE to the opposing surfaces tends to fill the roughness, improve the seal, and reduce the friction between the moving parts, with the elasticity of the composition continuing to maintain an effective seal.

One application of the invention is to watercraft which are required to move through the water as fast as possible or with the greatest efficiency possible, and more particularly to an improved outer hull covering for such watercraft which provides, among other advantages, reduced drag caused by water resistance to such movements. In connection with the movement of any object underneath or across the surface of the water, there is a continuous force exerted against such movement which is measurable and is composed of several factors, one of which is friction. This resistance to movement through water is commonly termed "drag". With any "watercraft," which term is used in this application to mean any craft or other structure that can carry people or cargo underneath or over the surface of water, drag is a major concern because it is a significant factor in determining the maximum speed at which movement is possible as well as the efficiency of such movement in terms of cost, energy expended and the like.

In an effort to minimize drag and maximize our ability to efficiently move through water, much research has been done and continues to be done both in private industry and in civilian and military branches of government. This research involves not only variations in the design, weight and other characteristics of the watercraft themselves, but also work with paints and other coatings, solutions, and various methods attempting to decrease this water resistance to movement and thereby increase the efficiency of water travel.

Examples of such ongoing work are shown, for example, in U.S. Pat. Nos. 3,230,919; 3,575,123; 3,990,381; 4,073,983; 4,088,622; 4,088,623; 4,241,682; and French Pat. No. 2,050,794.

Other problems with the watercraft besides drag are encountered which impair efficiency and inconvenience or endanger travelers or cargo on board such craft. One example is fouling, which refers to the buildup of foreign matter including grass or marine organisms such as algae, barnacles, and various shells which become attached to the underwater portion of the hull or other structure. A second problem is that sound travels readily through metal hulls of watercraft creating not only a nuisance, i.e., noise, but possibly a dangerous situation as with submarines and other military vessels.

In addition to the examples of the patents above, applicant is generally aware that research has been conducted at military and civilian facilities for many years in an effort to find an effective solution to efficient movement through water by watercraft, having lessened drag and eliminating problems such as fouling, sound transfer, repeated maintenance, and difficulties of repair and others. The search is ongoing and has led applicant to his present discovery.

Compositions, such as those in Example 1, can be prepared in the form of flattened layers or sheets and used as panels. These panels can correspond to patterns taken from the outer hull or surface of the watercraft, such that the sheet material is later assembled and adhered to a particular hull design or shape, much as a jigsaw puzzle. The possible thickness of applicant's covering layer is limited only by consideration such as cost, added weight, and the like. Applicant's preferred thickness range is about 0.1–0.5 inch, with about 0.1 inch being most preferred.

The preferred method of attachment is to adhere the covering layer to the outer surface of the craft by an adhesive such as, for example, those commonly used for bonding natural rubber and synthetic elastomers to metal and various other substrates. The bonding agent used with applicant's preferred ethylenepropylene terpolymer base material was a CA-40 brand bonding agent marketed by the 3M Company, which satisfies government specification MIL A 46050C TYPE 1 CLASS 1 for military use, and is known to bond ethylenepropylene polymers to metal substrates and themselves. Other adhesives and methods of attachment, of course, can be substituted with this or other base elastomers and are within the scope and contemplation of applicant's invention.

The preferred covering layer was attached directly to the metal substrate being covered such as the hull or other surface of a craft. An alternate embodiment is to use the covering layer to form the outer layer of a laminate structure. The object of such a laminate can be to achieve improved properties such as adhesion, specific gravity, durability or impact tolerance, heat insulation, sound attenuation or absorption, and others. Differences in construction such as, for example, a honeycomb inner layer can also be used if desired for a specific application.

The invention permits the compounding of compositions having improved properties in many other applications. For a simple example, if the object were to make a bumper to cushion the automobile door when it slams and to keep it from rattling when it is closed, the bumper must be hard enough to stay in its slot when the door is slammed; it must be soft enough to cushion the door, yet must have a sufficient modulus of elasticity to keep the door from rattling when it is closed; it must preferably last for the life of the car which can be expected to be on the order of five to ten years; and it must be inexpensive.

The first step in deciding upon the composition of such a rubber product would be to decide upon the physical properties, such as hardness, permanent set, resilience, tensile strength, and the like. One of the advantages of compositions of the invention is their greater tolerance to aging. The method of manufacture of the product must also be considered. Since such bumpers can have a simple shape, such as a polyhedron, it may be manufactured in simple molds from an extruded preparation of mixed composition cut into short blanks with a size sufficient to fill the mold under pressure. Thus, the composition may be extruded in the form of a uniform strip and should have good extruding characteristics. A quick cure is desirable for it is more economical than an extended cure; but it is desirable to avoid scorching and to obtain a composition that will not partially cure if it is not immediately molded. In addition, such bumpers will generally be rather thick; so the mixed rubber should be cured slowly enough that the outside does not cure long before the inside. Generally, determining a composition for any application requires trial and error and several mixes are formulated for testing in such applications.

EXAMPLES 27 AND 28

Using the invention for such bumpers may, for example, lead to a composition including reclaimed tire rubber in 200 parts by weight, particulate PTFE in 50 to 100 parts by weight, an effective amount of molybdenum disulfide, and 10 parts by weight of antioxidants, sulfur, accelerator and fillers. Another formulation of the invention usable in such application may include 100 parts by weight oil extended, styrenebutadiene rubber, 50 to 100 parts by weight particulate PTFE, an effective amount of molybdenum disulfide, and 10 parts by weight antioxidant, sulfur, accelerators, and other fillers. With this invention, the resulting automobile door bumpers will have a substantially reduced tendency to squeak because of their surface lubricity.

Other products of applicant's invention may include:

EXAMPLE 29

A composition for use in the tread and sidewalls of an automobile tire comprising an elastomer selected from a group including a styrene butadiene rubber, natural rubber and the like in the range of about 88 weight percent to about 98 weight percent, fibrillated PTFE in the range of about 1 weight percent to about 4 weight percent, an effective amount of molybdenum disulfide, and one or more additives selected from a group comprising plasticizers and softeners, extenders, reclaimed rubber, inert fillers, carbon black, antioxidants, and accelerators and activators. Additional amounts of particulate granular PTFE in the range of 6 to 10 percent may be added along with corresponding amounts of $MOS_2$. For roadgraders and off-highway vehicles and machinery, higher percentages of ground PTFE may be incorporated into the tread composition.

EXAMPLE 30

A composition for the seal of an hydraulic cylinder comprising neoprene in a range of about 50 weight percent to about 75 weight percent, a blend of particulate PTFE and fibrillated PTFE in the range of about 25 weight percent to about 50 weight percent, said fibrillated PTFE being present in an amount equal to about 4 weight percent of the total composition, an effective amount of molybdenum disulfide, the neoprene component containing one or more fillers selected from a group comprising plasticizers and softeners, inert fillers, carbon black, antioxidants, and accelerators or activators in an amount from about 5 percent to about 30 percent.

EXAMPLE 31

A composition for a tank pad for a military tank comprising a styrene-butadiene copolymer elastomer, a blend of particulate PTFE and fibrillated PTFE in a range of about 2 weight percent to about 6 weight percent, an effective amount of molybdenum disulfide, and one or more curing agents selected for processability.

Products of applicant's invention, for example, include an improved automobile tire including a bead, a casing, and a tread and sidewall with a cured composition of Example 16, and O-ring seal formed from the cured composition of Example 2, a lip seal for an hydraulic cylinder formed from the cured composition of Example 16, and a tank pad for a military tank molded from the cured composition of Example 31. These products each provide improved life and durability in their applications that is several times that obtainable with compositions known prior to the invention.

Using the invention, other compositions, including elastomers and polytetrafluoroethylene may be compounded to provide the products above or any of the following products: windshield wiper blades, combination bearing-seals for a rotating shaft, pump seals, valve seals, static body seals (e.g., door seals) for automobiles, and other such dynamic seals where lubricity, corrosion and abrasion resistance can be desirable. Products made with compositions of this invention may be manufactured by the manufacturing techniques and processes in common use in industry. Such products may be either extruded or molded by transfer, injection and compression molding and the like or both.

Other specific products, compositions, methods and other embodiments may be devised without departing from the spirit and scope of the invention as set forth in the following claims.

I claim:
1. A composition comprising:
(a) at least 25 percent by weight and not in excess of about 80 percent by weight of polytetrafluoroethylene, a small percent of said polytetrafluoroethylene being fibrillated in the composition;
(b) an amount of molybdenum disulfide not exceeding about 30 percent by weight, and
(c) the balance of an elastomeric material, said amount of molybdenum disulfide being effective to uniformly incorporate said polytetrafluoroethylene into said elastomer upon mixing the polytetrafluoroethylene into the elastomer with said molybdenum disulfide.

2. The composition of claim 1 which is a substantially homogenous combination of said components.

3. The composition of claim 2 in the form of a cured layer having a thickness of about 0.01–0.05 inch.

4. The composition of claim 2 in which said polytetrafluoroethylene is a reprocessed powder.

5. A composition containing:
(a) about 25 percent to about 50 percent by weight of polytetrafluoroethylene particles, at least 2 percent to about 6 percent by weight of polytetrafluoroethylene being fibrillated in said composition;
(b) an effective amount of molybdenum disulfide lying in the range of about 3 to about 20 percent by weight; and
(c) the balance of an elastomeric material, said amount of molybdenum disulfide being effective to uniformly incorporate said polytetrafluoroethylene particles into said elastomer upon mixing the polytetrafluoroethylene particles into said elastomer with said molybdenum disulfide.

6. The composition of claim 5 in which said elastomeric material is an ethylene-propylene terpolymer.

7. A composition resulting from a method comprising:
mixing together an elastomer, particulate polytetrafluoroethylene in an amount at least 25 percent by weight of the total composition and not exceeding about 80 percent by weight of the total composition, said particulate polytetrafluoroethylene including at least about 2 percent to about 6 percent of fibrillated polytetrafluoroethylene and an amount of molybdenum disulfide that is effective to uniformly incorporate the particulate polytetrafluoroethylene in the elastomer, said mixed composition comprising at least about 0.5 parts of molybdenum disulfide per part of particulate polytetrafluoroethylene.

8. The composition resulting from the further steps of molding and curing the composition of claim 7.

9. The composition of claim 7 wherein the particulate polytetrafluoroethylene includes at least about 2 percent to about 6 percent fibrillated material.

10. A composition resulting from the steps of:
mixing together an elastomer and a particulate polytetrafluoroethylene with an amount of molybdenum disulfide to effect uniform mixing of the polytetrafluoroethylene in the elastomer, said mixture including at least about 2 percent to about 6 percent of fibrillated polytetrafluoroethylene; and
molding and curing the mixture to obtain an elastomeric solid.

11. The composition of claim 10 wherein the mixture includes about 4 percent by weight fibrillated polytetrafluoroethylene and about an equal amount of molybdenum disulfide.

12. A composition comprising:
a solid matrix of cured elastomeric material, particulate polytetrafluoroethylene and molybdenum disulfide in which at least about 2 percent to about 6 percent of said particulate polytetrafluoroethylene comprises fibrillated polytetrafluoroethylene that is uniformly dispersed in the elastomer matrix with particulate molybdenum disulfide.

13. The composition of claim 12 wherein the particulate polytetrafluoroethylene comprises at least 25 percent by weight of the total composition.

14. The composition of claim 12 wherein the fibrillated polytetrafluoroethylene is present in an amount of about 2 percent to about 6 percent by weight of the total composition and the total amount of particulate polytetrafluoroethylene is less than about 12 percent.

15. The composition of claim 12 wherein the particulate polytetrafluoroethylene comprises at least 25 percent by weight to about 50 percent by weight of the total composition.

16. A composition, comprising:
(a) about 2 to about 6 percent fibrillated polytetrafluoroethylene;
(b) an effective amout of molybdenum disulfide; and (c) the balance of an elastomeric material, said amount of molybdenum disulfide being effective to uniformly incorporate said fibrillated polytetrafluoroethylene into the elastomeric material.

17. The composition of claim 16 comprising additional non-fibrillated polytetrafluoroethylene particles and an amount of molybdenum disulfide effective to uniformly incorporate said particulate polytetrafluoroethylene into said elastomeric material.

18. The composition of claim 16 wherein said elastomeric material is an ethylene propylene terpolymer resin.

19. The composition of claim 16 wherein said elastomeric material is a silicone rubber.

20. The composition of claim 16 wherein said elastomeric material is a nitrile rubber.

21. The composition of claim 16 wherein said elastomeric material is a butadine acrylonitrile elastomer.

22. The composition of claim 16 wherein said elastomeric material is selected from a group consisting of a styrene butadiene rubber and natural rubber.

23. The composition of claim 22 comprising an additional granular polytetrafluoroethylene in the range of about six to about ten percent by weight and an additional amount of molybdenum disulfide that is effective to a uniformly mix the granular polytetrafluoroethylene into the composition.

24. The composition of claim 16 wherein said elastomeric material is a neoprene.

* * * * *

UNITED STATES PATENT AND TRADEMARK OFFICE
CERTIFICATE OF CORRECTION

PATENT NO. : 4,596,839

DATED : June 24, 1986

INVENTOR(S) : William E. Peters

It is certified that error appears in the above-identified patent and that said Letters Patent is hereby corrected as shown below:

In col. 1, line 59, delete "contents" and insert -- content -- therefor.

In col. 7, line 22 (heading of chart), delete "9" and insert -- 8 -- therefor. Line 22 should read:
--EXAMPLE    3    4    5    6    7    8--.

In col. 11, line 61, delete, "cis-" and insert -- cis- -- therefor.

In col. 20, line 4 (claim 21, line 2), delete "butadine" and insert -- butadiene -- therefor; in col. 20, line 12 (claim 23, line 5), delete "a".

Signed and Sealed this

Seventh Day of October, 1986

[SEAL]

Attest:

DONALD J. QUIGG

Attesting Officer

Commissioner of Patents and Trademarks